United States Patent
Teitelman et al.

(10) Patent No.: US 9,401,990 B2
(45) Date of Patent: *Jul. 26, 2016

(54) SYSTEM AND METHOD FOR REAL-TIME CUSTOMIZED AGENT TRAINING

(71) Applicant: NICE SYSTEMS LTD., Ra'anana (IL)

(72) Inventors: Michael Teitelman, Tel Aviv (IL); Leon Portman, Rishon Lezion (IL)

(73) Assignee: NICE-SYSTEMS LTD., Ra'anana (IL)

(*) Notice: Subject to any disclaimer, the term of this patent is extended or adjusted under 35 U.S.C. 154(b) by 301 days.

This patent is subject to a terminal disclaimer.

(21) Appl. No.: 14/067,071

(22) Filed: Oct. 30, 2013

(65) Prior Publication Data

US 2014/0050309 A1 Feb. 20, 2014

Related U.S. Application Data

(63) Continuation of application No. 13/302,894, filed on Nov. 22, 2011, now Pat. No. 8,600,034.

(51) Int. Cl.
*H04M 3/00* (2006.01)
*H04M 5/00* (2006.01)
*H04M 3/51* (2006.01)
*H04M 3/42* (2006.01)

(52) U.S. Cl.
CPC ........ *H04M 3/5175* (2013.01); *H04M 3/42221* (2013.01); *H04M 3/51* (2013.01); *H04M 2201/40* (2013.01); *H04M 2203/403* (2013.01); *H04M 2203/404* (2013.01)

(58) Field of Classification Search
CPC ........... H04M 3/5175; H04M 3/5233; H04M 3/5232; H04M 2203/401; H04M 3/42221
USPC .............. 379/265.01, 265.02, 265.05, 265.06
See application file for complete search history.

*Primary Examiner* — Nafiz E Hoque
(74) *Attorney, Agent, or Firm* — Pearl Cohen Zedek Latzer Baratz LLP (57) ABSTRACT

A system, device and method is provided for handling customer-agent interactions. An unsuccessful interaction may be detected between a customer and a first agent unable to resolve a problem. A successful interaction may be detected between the customer and a second agent that resolves the problem. The first agent may be sent a report summarizing the successful interaction by the second agent.

20 Claims, 6 Drawing Sheets

| | lInteractionID | dtContactGMTStartTime | dtContactGMTStopTime | AgentID | CustomerID |
|---|---|---|---|---|---|
| 1 | 5598538877251747841 | 2011-04-17 13:09:10.000 | 2011-04-17 13:09:27.000 | 12 | 232 |
| 2 | 5598540990375657473 | 2011-04-17 13:17:22.000 | 2011-04-17 13:17:41.000 | 33 | 232 |
| 3 | 5597586686063214593 | 2011-04-20 08:55:12.043 | 2011-04-20 08:55:26.023 | 42 | 232 |
| 4 | 5597611120132161537 | 2011-04-20 10:30:01.493 | 2011-04-20 10:30:11.987 | 53 | 232 |
| 5 | 5597619503908323333 | 2011-04-20 11:02:33.257 | 2011-04-20 11:04:39.613 | 55 | 84 |
| 6 | 5597620461686030345 | 2011-04-20 11:06:16.117 | 2011-04-20 11:06:23.873 | 33 | 3 |
| 7 | 5597635489776599053 | 2011-04-20 12:04:35.427 | 2011-04-20 12:04:43.407 | 55 | 22 |
| 8 | 5597637285072928785 | 2011-04-20 12:11:33.850 | 2011-04-20 12:11:37.570 | 232 | 6 |
| 9 | 5597637392447111189 | 2011-04-20 12:11:58.410 | 2011-04-20 12:12:15.763 | 55 | 2 |
| 10 | 5597649843557302297 | 2011-04-20 13:00:18.067 | 2011-04-20 13:00:32.453 | 434 | 12 |
| 11 | 5597650012273017654 | 2011-04-20 13:01:00.800 | 2011-04-20 13:01:04.197 | 33 | 3 |
| 12 | 5597983904779023564 | 2011-04-20 13:01:22.100 | 2011-04-20 13:01:25.040 | 55 | 3 |
| 13 | 5597983944292722689 | 2011-04-26 10:31:39.150 | 2011-04-26 10:32:18.013 | 12 | 3 |
| 14 | 5597983868774036276 | 2011-04-26 10:33:13.320 | 2011-04-26 10:33:27.403 | 22 | 9 |
| 15 | 5597983947801434522 | 2011-04-26 10:34:10.963 | 2011-04-26 10:34:14.953 | 42 | 3 |
| 16 | 5600093117304471553 | 2011-04-26 10:37:14.133 | 2011-04-26 10:37:17.500 | 461 | 4 |
| 17 | 5597983997640616980 | 2011-04-26 10:39:02.523 | 2011-04-26 10:39:18.883 | 436 | 8 |
| 18 | 5597983997640616980 | 2011-04-26 10:39:05.557 | 2011-04-26 10:39:17.607 | 764 | 9 |

FIG. 3A

FIG. 3B — Table 302

| # | iInteractionID | dtContactGMTStartTime | dtContactGMTStopTime | AgentID | CustomerID |
|---|---|---|---|---|---|
| 1 | 5595538772251747841 | 2011-04-17 13:09:10.000 | 2011-04-17 13:09:27.000 | 12 | 232 |
| 2 | 5595540990375657473 | 2011-04-17 13:17:22.000 | 2011-04-17 13:17:41.000 | 33 | 232 |
| 3 | 5595758668063214593 | 2011-04-20 08:55:12.043 | 2011-04-20 08:55:26.023 | 42 | 232 |
| 4 | 5595761112013216537 | 2011-04-20 10:30:01.483 | 2011-04-20 10:30:11.987 | 53 |  |
| 5 | 5595765002824089029 | 2011-04-20 13:01:00.800 | 2011-04-20 13:01:04.197 | 33 | 3 |
| 6 | 5595765012273017645 | 2011-04-20 13:01:22.100 | 2011-04-20 13:01:25.040 | 55 | 3 |
| 7 | 5595938047790238649 | 2011-04-26 10:31:39.150 | 2011-04-26 10:32:18.013 | 12 | 3 |

FIG. 3C — Table 304

| # | iInteractionID | xmlAnalysis | CustomerID | SummaryID | AgentIDs |
|---|---|---|---|---|---|
| 1 | 14036943 | <AnalyticsDocument><Subject><Key><Type>Audio</Ty... | 232 | 45454 | 12,45, 85 |
| 2 | 14035999 | <AnalyticsDocument><Subject><Key><Type>Audio</Ty... | 3 | 5555 | 33, 88 |
| 3 | 14036003 | <AnalyticsDocument><Subject><Key><Type>Audio</Ty... | 4 | 8888 | 45,7,9 |
| 4 | 14036004 | <AnalyticsDocument><Subject><Key><Type>Audio</Ty... | 5 | 9999 | 42,77 |
| 5 | 14036005 | <AnalyticsDocument><Subject><Key><Type>Audio</Ty... | 87 | 7878 | ,53 |
| 6 | 14036006 | <AnalyticsDocument><Subject><Key><Type>Audio</Ty... | 5224 | 2154 | ,33,343 |
| 7 | 14036007 | <AnalyticsDocument><Subject><Key><Type>Audio</Ty... | 58 | 7666 | 55,1,4,0 |
| 8 | 14036008 | <AnalyticsDocument><Subject><Key><Type>Audio</Ty... | 96 | 5897 | ,12,76,6 |
| 9 | 14036009 | <AnalyticsDocument><Subject><Key><Type>Audio</Ty... | 69 | 8844 | 54,52,7 |
| 10 | 14036010 | <AnalyticsDocument><Subject><Key><Type>Audio</Ty... | 85 | 2418 | 1,445,6 |

SYSTEM AND METHOD FOR REAL-TIME CUSTOMIZED AGENT TRAINING

CROSS-REFERENCE TO RELATED APPLICATIONS

This application is a continuation application of U.S. patent application Ser. No. 13/302,894, filed Nov. 22, 2011, which is incorporated by reference herein in its entirety.

FIELD OF THE INVENTION

Embodiments of the invention relate to systems and methods for monitoring customer-agent interactions at call centers. In particular, embodiments of the invention relate to analyzing interactions for assessing agent competence and automatically training agents to improve future interactions.

BACKGROUND OF THE INVENTION

Company telephone call centers or Internet-based support forums put customers in contact with company agents for assistance. However, customers are often frustrated by the service they receive at support centers, for example, due to long wait times, repeated and unnecessary transferring between departments and agents that are poorly trained.

Agents' performance may be improved by increasing the agents' training. However, training sessions are typically designed to teach a general overview of a product or technology and may not address the specific details needed to solve real-life customer problems or issues. Furthermore, since each agent has a different level of competency, training sessions are often designed to be too difficult (beyond most agents' comprehension) or too easy (designed for the lowest-common-denominator among the agents).

SUMMARY

In some embodiments of the invention, a system, device and method is provided for handling customer-agent interactions. An unsuccessful interaction may be detected between a customer and a first agent unable to resolve a problem. A successful interaction may be detected between the customer and a second agent that resolves the problem. The first agent may be sent a report summarizing the successful interaction by the second agent. In one embodiment, the report may be sent to the first agent in real-time, for example, while the successful interaction with the second agent is ongoing. In another embodiment, the report may be sent to the first agent after the successful interaction, for example, at a predetermined time or time delay thereafter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A-3C schematically illustrate database tables for indexing customer-agent interactions in accordance with some embodiments of the invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Customers may receive inconsistent service at telephone and Internet help centers due to the variation in agent competency and training. To improve performance, embodiments of the invention may customize agent training according to their deficiencies to bring all agents up to the same level of proficiency. For example, each time an agent cannot solve a problem or resolve an issue and, for example, transfers the customer to another agent, if the other agent provides the solution, the solution may be reported back to the original agent to fill in the agent's deficiency in training. In one case, a customer call may be transferred again and again through a series of agents, none of which can solve the customer's problem or issue. Finally, if after a string of transfers, the solution is found, each agent the customer spoke to, downstream of the successful agent, may receive a report on the successful agent's solution. Alternatively, if none of the agents find a solution, a pre-generated solution may be automatically retrieved from a database or may be generated offline by a manager or specialist, and sent to the unsuccessful agents (e.g., agents who did not successfully handle an issue). Accordingly, agents may only be taught material they need to learn (solutions to problems they could not solve) for an efficient and customized adaptive learning system. Furthermore, agents may train each other using the byproducts of their actual work product, instead of specialized training materials or personnel, thereby reducing company costs. Transferring a customer from a first agent to a second agent may mean, for example, switching communication with the customer from a first agent to the second agent, or stopping a call or interaction session between the customer and the first agent and initiating a call or interaction session between the customer and the second agent. A successful interaction may be one where an issue or problem is resolved, and an unsuccessful interaction may be one where an issue or problem is not resolved, or where a customer is not satisfied with the interaction.

The successful agent's solution may be distilled into a written summary report, which may include the problem or issue to be solved and the solution. The written report may be entered manually by an agent, transcribed from the call using a speech-to-text and/or voice-recognition engine, or extracted from screen-shots captured from the agent's workplace display. The summary report may be sent to agents in real-time or immediately after the problem is solved (e.g., within a predetermined time so that the unsuccessful agent may recall their interaction with the customer), at a time delay (e.g., during a training session, at the end of a shift, etc.) and/or when the same problem, topic or customer is encountered again (e.g., defined by the same problem code or customer identification (ID)) as a reminder or reference for the agent to refresh his/her memory.

Instead of, or in addition to, training agents problem-by-problem, in one embodiment, agents may be trained based on the general category or topics of their unsolved problems. A learning system may analyze each agent's performance in each of a plurality of categories and analytically identify their one or more weakest categories. For example, each problem may be associated to one or more categories (e.g., identified by one or more problem codes). The categorization of each problem may be entered manually by an agent or user, identified by keywords spoken by the customer and transcribed by a voice-recognition engine, or captured by a screen-shot of the agent's workplace. When an agent fails to solve a problem in a specific category, an error meter may increment an error tally for that category. A training system may tally the cumulative errors for each of the categories, for example, at specific training time or when the agent accumulates an above threshold number of failed attempts (e.g., per category or in total). The training system may customize each agent's training program to provide training in each category commensurate with the agent's error tally or difficulty in that category. Therefore, instead of, or in addition to, giving the agent the solutions to each missed problem, an embodiment of the invention may provide the agent with an overall teaching of the categories where the agent has the greatest difficulty.

Embodiments of the invention may track agent performance over time to repeatedly or periodically update the agent's training package according to his/her most recent performance. In one example, agent performance may be positively (+) incremented for each issue or problem solved and/or negatively (−) incremented for each issue or problem left unsolved (or not satisfactorily resolved) to generate a proficiency score or profile. Embodiments of the invention may also generate automated performance reviews reflecting the agent's performance and improvement over time (e.g., overall or per training category), for example, as an absolute measure or relative to other agents' performance in the same department or company or an average of agent performance.

Figure 1:
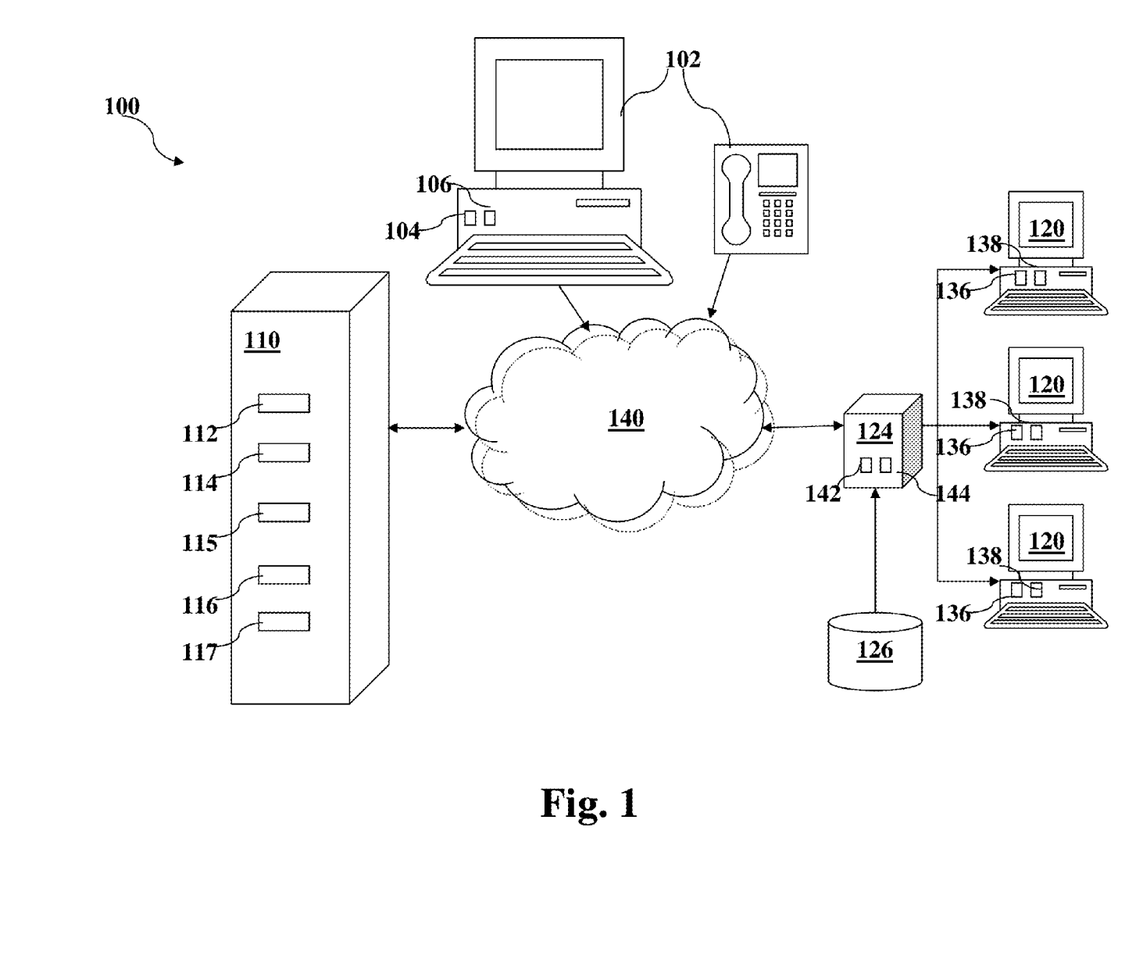
FIG. 1 schematically illustrates a system for monitoring interactions between a customer device and agent devices at a support center in accordance with an embodiment of the invention.

Reference is made to FIG. 1, which schematically illustrates a system 100 for monitoring interactions between a customer or user device 102 and one or more agent devices 120 at a support center 124 in accordance with an embodiment of the invention.

System 100 may include one or more user devices 102, such as, computers (for web or Internet connections), telephones (for telephone or radio network connections), or messaging or text enabled devices (for messaging network connections), for the user to interact with and communicate with agents over one or more networks 140. Customers may use user devices 102 to connect to live or automated agents, for example, using or operating on agent devices 120 at support center 124.

Support center 124 may include company call centers (for telephone-based support) or online support forums (for Internet-based support) to automatically connect user devices 102 to agent devices 120, for example, to provide customers with technical support, sell products, schedule appointments, or otherwise interact or communicate with customers. Support center 124 may include a switching station to order and connect each of a plurality of user devices 102 to one of a plurality of agent devices 120 at the same time. Support center 124 may order customers in a queue, for example, to be served on a first-come first-serve basis. Support center 124 may connect each customer's user devices 102 to the next available agent's device 120 from a pool of available agents, for example, to provide the fastest agent response time.

Support center 124 may be connected to (or include) a training module 110, which may track, log, and analyze customer-agent interactions for recording agent successes and failures and/or assessing agent competence or proficiency levels. Agent successes and failures may be reported by the customer or agent or may be automatically determined by support center 124, agent device 120 or training module 110, for example, by detecting a transfer of the customer to another agent, a customer that repeatedly contacts support center 124 within a predetermined time period, and/or negative tone, words, descriptions received, detected or analyzed from a customer's text or speech sample, or other methods. For example, a transfer of a customer from a first agent to a second agent may deem the customer interaction with the first agent to be a failure and that the first agent was unable to resolve a problem. For each failed agent communication, training module 110 may find a successful solution recorded for another agent to the same or similar problem and may report the solution to each failed agent, thereby automatically training each agent according to the agent's specific deficiencies.

Training module 110 may include a log module 117 to keep logs of, or index, each interaction. Each interaction may include, for example, audio, messaging, or written recordings of the customer and agent(s) communications, agent device 120 screenshots, extracted data or metadata communicated between user device 102 and agent devices 120, etc. Interactions information may be stored, for example, in an interaction database 126. Each interaction may be uniquely defined by a single customer and/or a single problem or issue (e.g., logged by a customer ID and problem ID), but may be transferred or re-connected to multiple agent devices 120 over multiple intervals of time. In some examples, a single interaction may occur over multiple telephone calls or web sessions or cross-channel communications. Conversely, a single telephone call or web session may include multiple interactions for each different customer problem.

When an interaction between a customer and agent is successful, support center 124 may disconnect user devices 102 and agent device 120 and training module 110 may record an interaction success and close a log of the customer interaction. However, when an interaction is unsuccessful (e.g., the agent handling the issue is termed an "unsuccessful agent" and has failed to resolve a problem), support center 124 may transfer user devices 102 (e.g., transfer a communications connection) upstream to a different agent's device 120 and training module 110 may record an interaction failure and keep the log of the customer interaction open. Support center 124 (or agent devices 120 themselves) may iteratively transfer user devices 102 after each unsuccessful interaction to a different subsequent agent's device 120 until training module 110 detects a successful interaction with a final agent device 120.

Training module 110 may include an analysis module 115 to generate a report of the successful interaction with the final agent device 120. Analysis module 115 may input, for example, an audio recording of the successful interaction, screenshots of the successful agent's and/or user's device(s) screens, or a summary generated by the successful agent themselves. Analysis module 115 may output, for example, a written summary report, tips, a slideshow or recommended screenshot steps, an edited audio file, the correct agent/department to handle the problem, specific key-words from the summary that indicate the correct department or agent to handle the problem or issue, the statistical difficulty of finding the correct solution, such as, the number of failed agent attempts, the percentage of agents in the department able to solve the problem or similar problems, etc. In some embodiments, analysis module 115 may verify the reports for quality assurance, for example, by comparing the report automatically to a template report for a similar problem or by requesting the successful agent or a third-party manager or network administrator to generate, edit or verify the report for accuracy. Once the report of the successful solution is generated, training module 110 may use a real-time interaction module 116 to send the report, e.g., in real-time, to each of the plurality of downstream agents' devices 120 that unsuccessfully engaged in the same interaction (e.g., associated with the same customer and problem ID). The report may be sent over network 140 from training module 110 to agent device 120, for example, directly or indirectly via another device, such as, support center 124. The report may be sent as a file (e.g., a text file, a .pdf file, an XML file), data packets, a link or address to the report stored in database 126, or a voice, text or multimedia communication using email, messaging, or a pop-up window on the screen of agent device 120.

System 100 may track customer-specific profiles by providing agent devices 120 with access to database 126 storing information related to each user's interaction histories at support center 124 or over the web and/or other networks, such as television or radio network(s). For example, database 126 may store customer web or television preferences (e.g., favorite rated or most-frequently watched shows, sports team, channels, etc.). Using this information, training module 110 may provide agents with recommendations, for example, for selling or promoting related shows, movies, sports games, websites, and may connect to other company servers to share or compare customer information. When agent device 120 is connected to user device 102, agent device 120 may automatically, or after sending a request, gain access to the user's interaction history in database 126 (e.g., including all log entries associated with the customer's ID, the interactions themselves, reports summarizing the solutions to their problems and/or personal profile preferences/sale recommendations).

User device 102 and agent device 120 may be personal computers, desktop computers, mobile computers, laptop computers, and notebook computers or any other suitable device such as a cellular telephone, personal digital assistant (PDA), video game console, etc., and may include wired or wireless connections or modems. User device 102 and agent device 120 may be connected via a web connection, a telephone connection, a messaging connection and/or via one or more communication networks 140. User device 102 and agent device 120 may include one or more input devices, for receiving input from a customer or agent (e.g., via a pointing device, click-wheel or mouse, keys, touch screen, recorder/microphone, other input components) and output devices (e.g., a monitor or screen) for displaying data to a customer or agent.

User device 102, agent device 120, support center 124 and training module 110, may each include one or more controller (s) or processor(s) 106, 136, 142 and 112, respectively, for executing operations and one or more memory unit(s) 104, 138, 144 and 114, respectively, for storing data and/or instructions (e.g., software) executable by a processor. Processor(s) 106, 136, 142 and 112 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 104, 138, 144 and 114 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 2:
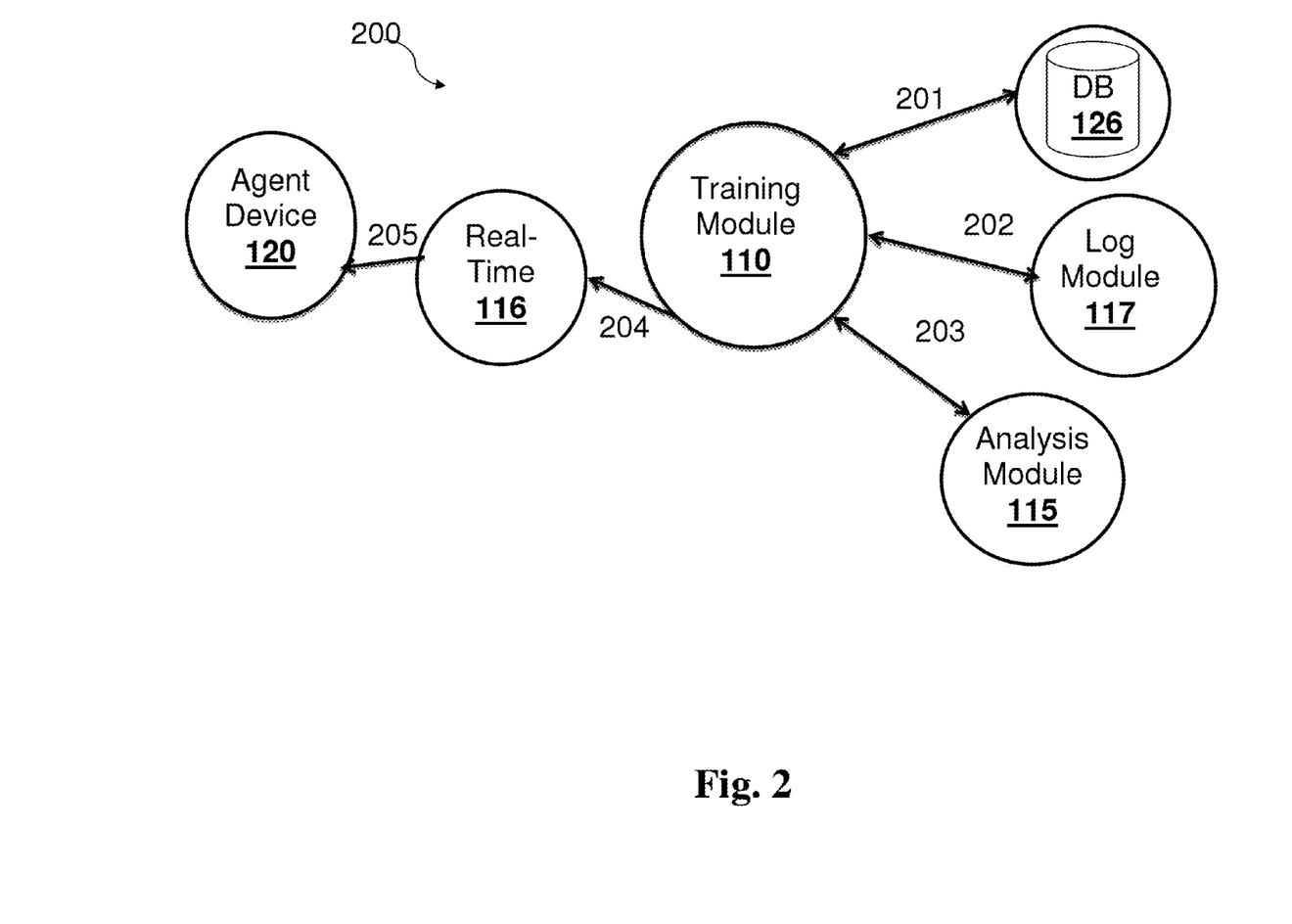
FIG. 2 schematically illustrates a training system for training agents to resolve customer interactions in accordance with an embodiment of the invention.

Reference is made to FIG. 2, which schematically illustrates a training system 200 for training agents to resolve customer interactions in accordance with an embodiment of the invention. System 200 may include components of system 100, such as, training module 110, analysis module 115, real-time interaction module 116, log module 117, agent device 120, and interaction database 126.

When a customer (e.g., using user device 102 of FIG. 1) repeatedly contacts a support center (e.g., support center 124 of FIG. 1) or is repeatedly transferred upstream to multiple agents with the same issue or problem, in operation 201, training module 110 may retrieve the final or successful interaction information (e.g., times, index, address or ID code) from database 126 (e.g., associated with the customer and/or problem ID). Transferring a customer "upstream" may mean transferring iteratively from agent to agent until an agent successfully handles an issue. Within each pair of agents, the first agent may be the agent who unsuccessfully handled the issue and the second agent the agent who successfully handled the issue. Pairs may overlap, in that a second agent in a pair may be a first agent in a successive pair. "Upstream" transfer may be to an agent higher in a hierarchy (e.g., with more experience or a higher position) but need not be. Similarly, sending a report or other data "downstream" may mean sending the data to each agent that previously connected to a customer regarding the issue related to the report during a call or web session or during multiple correlated calls.

In operation 202, training module 110 may connect to log module 117 to locate and retrieve the actual successful interaction recording according to the interaction information from operation 201. The interaction recording may include, for example, audio, messaging, or written recordings of the customer and agent(s) communications, agent device 120 screenshots, extracted data or metadata communicated between the customer and agent devices 120, etc.

In operation 203, training module 110 may connect to analysis module 115 to input the interaction recording (e.g., an audio file), analyze the recording (e.g., using audio analysis engine 418 of FIG. 4), and generate a summary of the interaction (e.g., using reporting templates and/or logic).

In operation 204, training module 110 may use real-time interaction module 116 to send the interaction summary downstream to each agent device 120, for example, from previous calls or previous transfers, that connected to the customer's user device, but did not successfully resolve the customer's problem.

Other operations or orders of operations may be used. For example, training module 110 may connect to log module 117 to retrieve the index of the successful interaction recording in database 126 (e.g., operation 202) before accessing the database (e.g., operation 201).

In a first customer-agent interaction, a customer may connect to multiple different agents before the customer receives a solution, for example, as follows (other or additional steps or orders or steps may also be used):

The customer (e.g., using user device 102 of FIG. 1) may contact a call center (e.g., support center 124 of FIG. 1) with a specific problem.

Figure 4:
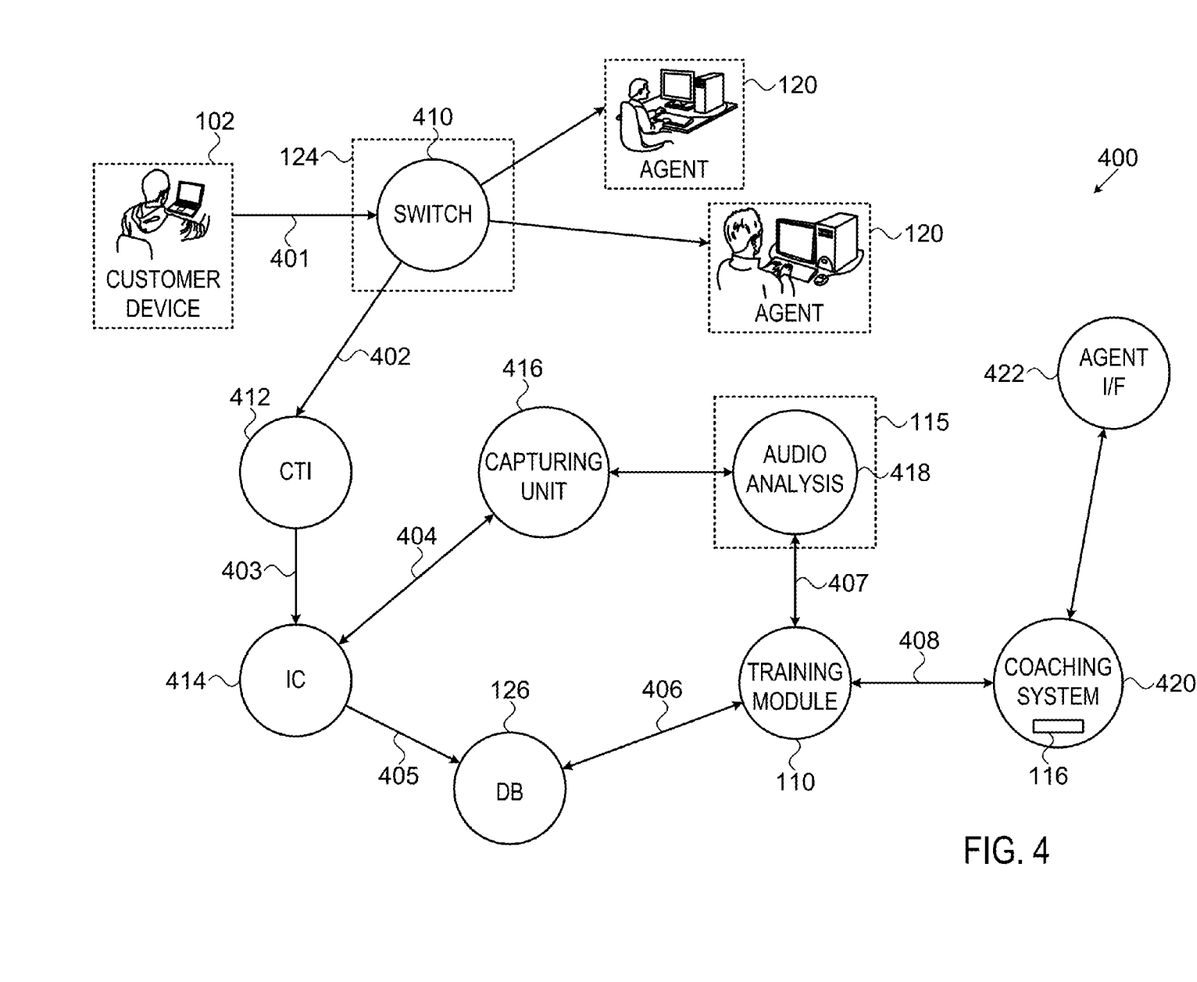
FIG. 4 schematically illustrates a system for training agents to resolve customer interactions in accordance with an embodiment of the invention.

An agent operating a first agent device (e.g., agent device 120 of FIG. 1), "Agent 1," may receive the call, but may fail to resolve the problem, and transfers the customer to another agent device, e.g., in another department (the customer may be transferred by an entity other than the agent, such as switch 410 of FIG. 4).

A second agent operating a second agent device, "Agent 2" may also fail to resolve the problem and may transfer the customer again to another agent device, e.g., in another department.

After a plurality of (N) connections with a plurality of (N) unsuccessful agents, a final agent, "Agent (N+1)" may successfully resolve the problem.

Each of the (N) agents (Agent 1-Agent N) downstream of the successful Agent (N+1) may receive a summary of the agent's successful solution.

Accordingly, training systems may assess knowledge gaps between agents (e.g., across multiple departments) to provide real-time customized training information targeted to each agent.

In a second customer-agent interaction, a customer may connect to two (or more) agents in the same department (in the same or different calls or interaction sessions), where only the second (or later) agent successfully solves the customer's problem, for example, as follows (other or additional steps or orders or steps may also be used):

The customer may contact the call center with a specific problem X.

Agent 1 may receive the call, but may fail to solve problem X.

The customer may not be transferred to another department. For example, Agent 1 may attempt to transfer the customer to another department but the call may disconnect before the transfer is complete.

The customer may contact the call center again with the same problem X and may be transferred to the same department, but to a different Agent 2 in the same department.

Agent 2 may successfully solve the customer's problem X.

Agent 1 may receive the solution generated by Agent 2 and instructions not to transfer such calls.

Accordingly, training systems may assess knowledge gaps between agents within a single department for department-specific targeted learning.

In general, when a customer is iteratively transferred through a sequence of multiple agents, the solution summary may be sent to all previously involved ("downstream") agents or to only a sub-set of those agents, for example, that meet one or more training criteria, such as, agents in the same department, agents with same target training level, agents with the same security clearance or agents who have failed to provide solutions to other problems in the same training category a predetermined number of times.

In some embodiments, a training module (e.g., training module 110 of FIG. 1) may use an "online" or "on-the-fly" solution to train the unsuccessful agents to solve a customer problem while the agent interacts with the customer (e.g., in real-time using real-time interaction module 116 of FIG. 1). In other embodiments, the training module may use an "offline" or post-processing solution to train the unsuccessful agents to solve a customer problem after the agent interaction has completed. For example, using the offline solution, the training module may search an interaction database (e.g., database 126 of FIG. 1) for specific predefined interaction patterns (e.g., calls with greater than a predetermined number of (N) transfers or greater than a predetermined number of (N) repeated calls for the same problem (X)). The training module may generate a report or summary of the solution for problem (X), save the solution to a table in the database and distribute the solution (e.g., automatically or when requested by the agent) to train the relevant agents.

Customer-agent interactions may use for example voice/Voice over Internet Protocol (VoIP), chat, texting or messaging, micro-blogging, video, Internet, email and/or other communications.

Figure 3A:
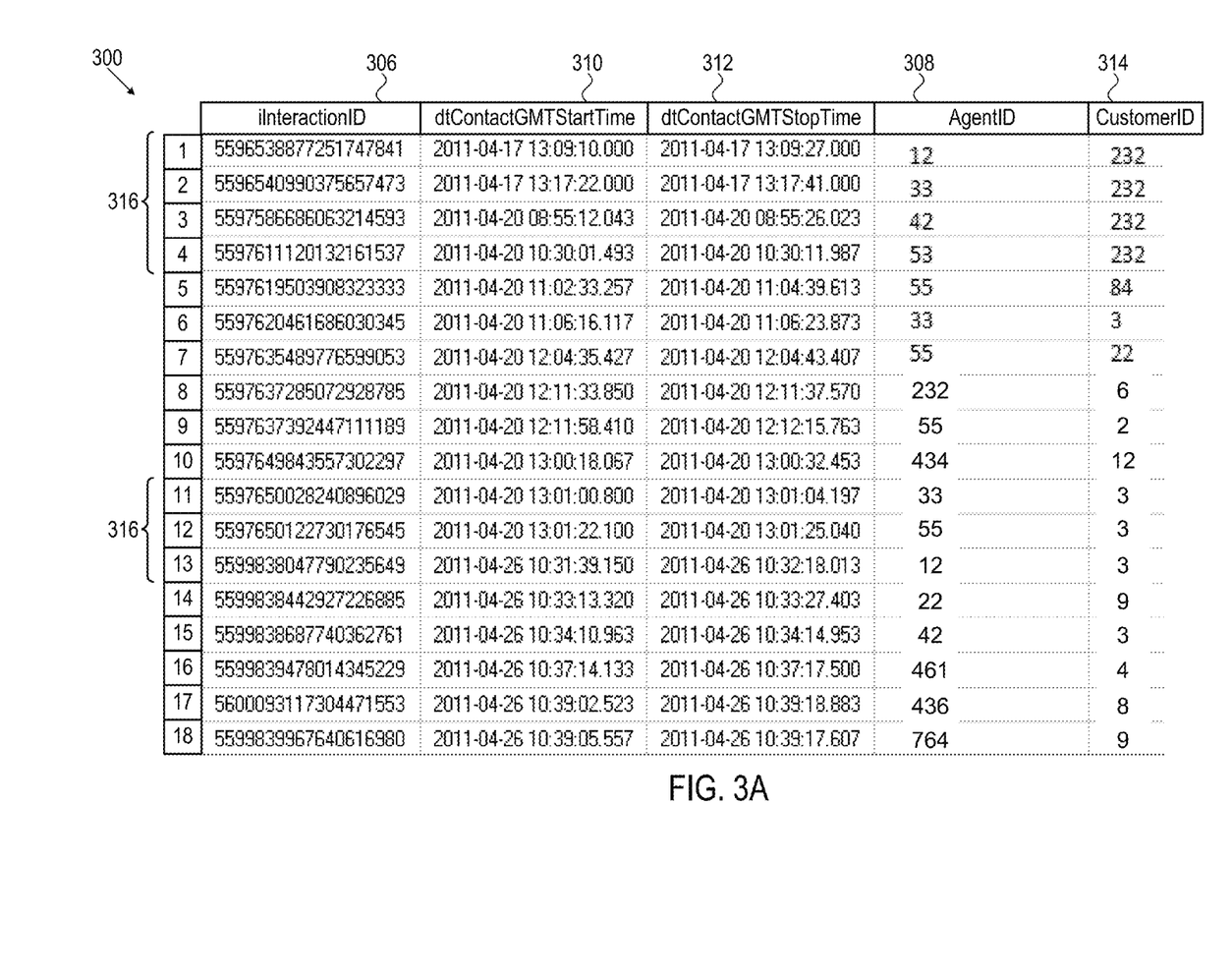

Reference is made to FIGS. 3A-3C, which schematically illustrate database tables 300-304 for indexing customer-agent interactions in accordance with some embodiments of the invention. Database tables 300-304 may be stored in a database (e.g., database 126 of FIG. 1) and managed, for example, using a structured query language (SQL). A training module (e.g., training module 110 of FIGS. 1 and 2) may monitor customer-agent interactions in database table 300 to send each agent device a unique set of customized training materials according to the agent's unique history of failed and/or successful interactions.

The training module may connect to the database, access a relevant table 300 and search table 300 for logs or entries 316 of "interesting" customer-agent interactions at a support center (e.g., support center 124 of FIG. 1). Interesting interactions may be interactions that meet predefined criteria, such as, for example, interactions corresponding to logs for:

Interaction sessions of calls with more than X interactions (e.g., where X is a predetermined number);

Calls with more than X transfers;

Interactions involving customers that called the support center more than X times (or more than X times for a certain issue);

Interactions involving customers transferred or re-connected more than X times (or more than X times for a certain issue);

Interactions involving customers that called the support center more than X times (or more than X times for a certain issue), where the agent that successfully solved the customers' problem in the final call is in the same department as one or more of the unsuccessful agents from the previous calls.

Other or additional predefined criteria may also be used.

After identifying the interesting interaction entries 316, the training module may extract information from table 300 for those entries 316 including, for example, an interaction ID 306, an agent ID 308, an interaction start time 310, an interaction stop time 312 and/or a customer ID 314. The training module may store the interesting interaction data, for example, as an extensible markup language (XML) file, and the interesting interaction log as entry 316 in a database table 302 as shown in FIG. 3B. In one example, table 302 is a compressed version of table 300 including copies of only interesting interaction entries 316 from table 300.

The following is an example of pseudo-code that, when executed by the training module, may extract interesting interaction entries 316 from table 300 and inserts interesting interaction entries 316 into table 302.

```
insert into tblRecording11 (iInteractionID,
    AgentID,
    customerID,
    dtRecordingGMTStartTime,
    dtRecordingGMTStopTime)
    select iInteractionID,
    AgentID,
    customerID,
    dtRecordingGMTStartTime,
    dtRecordingGMTStopTime from tblRecording03
    /* from what time it's running
        where dtRecordingGMTStartTime >'2011-06-27'
        group by iChannel
        having count(*)>1
        order by 2 desc*/
```

This pseudo-code is written here as an SQL script, although other or additional programming languages or structures may be used.

Once interesting interaction entries 316 are identified in table 300 and/or stored in table 302, the associated interaction data may be retrieved from storage in an interaction database (e.g., database 126 of FIG. 1). The interesting interactions may be located in the database, for example, indexed by the entry's 316 interaction ID 306, the row or entry 316 number in table 300 and/or 302, and/or a pointer or link from database table 300 and/or 302 to the database.

Once retrieved, the interesting interaction data may be analyzed, for example, by an analysis module (e.g., analysis module 115 of FIG. 1), which may generate a report or summary of each interesting interaction. In some embodiments, the summary report may be generated for only successful interactions, while in other embodiments, the summary report may be generated for both successful and unsuccessful interactions. In some embodiments, the recordings may be audio files and the analysis module may analyze the audio using voice recognition and/or speech-to-text engines (e.g., as audio analysis module 418 of FIG. 4). The audio analysis module may recognize key-words and extract surrounding sentences or phrases to automatically generate a report or summary of the interaction. The analysis module may store the report or summary for the interesting interaction in the database, for example, as an XML file, and/or a log for the interesting interaction, for example, as an entry 322 in a summary table 304 as shown in FIG. 3C. Summary table 304 may store one or more of the following data for each interesting interaction entry 322 (other or additional data may also be used):

Interaction ID 306'—an ID identifying a summary of the last agent interaction in a string of one or more interactions associated with the same customer and/or problem. A summary may be generated for each interaction string and identified by interaction ID 306'. For example, the first interaction ID 306' (14035943) in table 304 identifies a summary of the last agent interaction entry 316 in tables 300 and 302 associated with the same customer ID 314 (232), which has interaction ID 306 (5597611120132161537);

Agent IDs 308' (e.g., agent IDs for all agents involved in the interaction—may include multiple agent IDs 308);

Customer ID 314;

XML summary analysis 318—may identify a summary report (e.g., an XML file) stored in the interaction database; and Summary ID 320—an ID identifying a summary report, such as, XML summary analysis 318.

The analysis module may transfer summary ID 320 to the training module. The training module may connect to the database and use summary ID 320 to retrieve the summary report, agent ID, and/or customer ID from the database. The training module may send the summary file and/or the original interaction file for the solution to the relevant agents involved in the interaction (e.g., identified by agents IDs 308' for the unsuccessful agents, typically not the final successful agent). In one embodiment, a modified summary may be sent to successful agents, for example, listing the problem and/or solution and, instead of noting that the agent failed to solve the problem (as for unsuccessful agents), commending the successful agent on a job well done and/or noting the statistical difficulty of finding the correct solution (e.g., found after X failed attempts, known by P % of the department, etc.).

Reference is made to FIG. 4, which schematically illustrates a system 400 for training agents to resolve customer interactions in accordance with an embodiment of the invention. System 400 may include components of system 100, such as, user device 102, training module 110, analysis module 115, real-time interaction module 116, agent device 120, support center 124, and interaction database 126.

In operation 401, support center 124 may receive a connection request from user device 102. Support center 124 may include a switch 410 to connect user device 102 with one or more agent devices 120, for example, transferred in sequence.

In operation 402, interaction information may be retrieved from switch 410. The information for each interaction may include, for example, interaction start time, stop time, customer information, and/or agent information. In one example, a computer-telephone integration (CTI) unit 412 may retrieve the interaction information for integrating multi-channel or multi-network communications from user device 102, such as, telephone and computer communications.

In operation 403, the interaction information may be transferred to call recording control components 414, for example, by support center 124.

In operation 404, capturing unit 416 may record interactions, for example, as defined by the support center rules. In one example, capturing unit 416 may include VoIP recording solutions to effectively capture, evaluate, analyze and improve multi-media interactions over an Internet Protocol (IP) network. The VoIP recording solutions may be provided to customers deploying IP telephony networks, for example, to enhance customer experience management over converging networks. Capturing unit 416 may capture/record relevant audio/calls and may store the captured data, for example, as data packets in log module 117 and indexed in database 126. To playback the interactions, capturing unit 416 may connect to a player device (e.g., agent device 120 operating a media player) and may send the player device the stored captured data packets (e.g., using a dedicated playback channel) and associated interaction information (e.g., start time, stop time, channel the audio has been recorded on, and interaction ID).

In operation 405, after the interaction ends, call recording control components 414 may store the associated interaction information into database 126 (including the interaction information initially retrieved in operation 402 and any additional information accumulated during the interaction, such as, the start and stop time for each interaction). Database 126 may include a table (e.g., table 300 of FIG. 3A) to store information for all interactions, for example, including interaction ID, call ID, agent ID, customer ID, start time, stop time, duration, etc. Database 126 may include an interesting interaction table (e.g., table 302 of FIG. 3B) to store information for interactions that meet predetermined criteria or follow predetermined patterns, for example, that include at least X transfers, include at least X different agents (e.g., within a predetermined period of time and/or within the same department), etc.

In operation 406, training module 110 may retrieve the interesting interaction information from database 126 (e.g., via table 302 of FIG. 3B).

In operation 407, training module 110 may send the interesting interaction information to an audio analysis module 418 (e.g., in analysis module 115 of FIG. 1). Audio analysis module 418 may receive the associated interaction file from database 126, for example, either directly or via training module 110. Audio analysis module 418 may include a speech-to-text engine to convert the audio/voice data from the interaction file into text data. Audio analysis module 418 may include a recognition engine using key-word, phrase and/or tone recognition to determine the meaning of interactions, themes, content, customer intent, current and future trends, opportunities and changes, etc. Audio analysis module 418 may include a summary module to generate a written (or audio) summary of the interactions. Audio analysis module 418 may store the summary in database 126. Database 126 may include a summary table (e.g., table 304 of FIG. 3C) to store information identifying the summary, such as, a summary file identifier (e.g., a pointer to an XML analysis file), the successful and/or unsuccessful agent(s) involved in the interaction, the customer(s) involved in the interaction, and/or any associated interaction information or IDs.

In operation 408, training module 110 may retrieve the summary of the solution from database 126 and may send the summary to all or a subset of agent devices 120 involved in the interaction string with the customer, for example, via agent interface 422. A coaching system 420 may determine the relevant set or subset of involved agent devices 120 to send the summary. In one embodiment, coaching system 420 may identify when specific triggers occur at agent devices 120. When these triggers occur, a desktop analytic device may transfer agent device 120 information to database 126 and/or create interactions or recordings. These interactions/recordings may be tagged, enabling easy searching, retrieval and evaluation of the interactions. Coaching system 420 may send the summary solution of a successful interaction to unsuccessful agent devices 120 (e.g., identified by agents IDs 308' in table 304 of FIG. 3C). Coaching system 420 may include a real-time interaction module 116 to send the summary of the successful interaction to the agent devices 120 in real-time, for example, while the successful interaction is ongoing or immediately after. In one embodiment, coaching system 420 may be installed on each agent device 120 via an agent interface 422 or may be installed remotely in training module 110 or a server at support center 124 to communicate with agent device 120 via a wired or wireless network connection, such as, the Internet.

Other operations or orders of operations may be used.

Audio analysis module 418 may analyze a customer-agent audio interaction (e.g., a telephone or VoIP interaction) by translating the audio file to a text file (e.g., using a speech-to-text engine), marking or flagging sentences or phrases in the text file that include one or more pre-defined search words and generating an interaction summary by compiling the marked sentences or phrases, for example, as follows. In the examples below, the pre-define words include: "I'm," "ok so I," "add" and "problem."

In a first example, a customer-agent audio interaction may be transcribed to text, for example, as follows:

Agent X: Good evening, how can I help you?
Customer: I'm flying in 4 hours from Denver to Dallas and I want to upgrade my seat using my points.
Agent X: let me check, what is your name, your member ID and the flight number?
Customer: my name is XXXX and my ID is YYYY and my flight number is ZZZZ.
Agent X: ok I see that you already called about this issue a few hours before, let me check with my supervisor about what I can do to help because you may upgrade only 24 hours before the flight.
Customer: ok thanks.
Agent X: ok so I talked with my supervisor and I got special approval to upgrade your seat even though your flight is only in 4 hours.
Customer: ok thanks a lot, bye.

Audio analysis module 418 may mark the customer sentence, "I'm flying in 4 hours from Denver to Dallas and I want to upgrade my seat using my points" since the sentence includes the pre-defined search word "I'm" and the agent X sentence, "ok so I talked with my supervisor and I got special approval to upgrade your seat even though your flight is only in 4 hours" since the sentence includes the pre-defined search words "ok so I".

Audio analysis module 418 may generate the following report for a relevant agent 2 summarizing the above interaction between the customer and agent X, for example, as follows:

Hello Agent 2.
The problem: I'm flying in 4 hours from Denver to Dallas and I want to upgrade my seat using my points.
The solution: Agent X in department Y proposed to the customer—ok so I talked with my supervisor and I got special approval to upgrade your seat even though your flight is only in 4 hours.

In a second example, a customer-agent audio interaction may be transcribed to text, for example, as follows:

Agent X: Good morning, how can I help you?
Customer: I have a problem calling you from my cell phone.
Agent X: let me check, what is your name and ID number?
Customer: my name is XXXX and my ID is YYYY.
Agent X: ok I see that you can't call us—blocked, if you want I can add to your package the ability to call us.
Customer: yes please.
Agent X: ok done, now you can call us.
Customer: thanks a lot, bye.

Audio analysis module 418 may mark the customer phrase, "problem calling you from my cell phone" since the sentence includes the pre-defined search word "problem" and the agent X phrase, "add to your package the ability to call us" since the sentence includes the pre-defined search word "add".

Audio analysis module 418 may generate the following report for a relevant agent 2 summarizing the above interaction between the customer and agent X, for example, as follows:

Hello Agent 2.
The problem: problem calling you from my cell phone.
The solution: Agent X in department Y proposed to the customer—add to your package the ability to call us.

Other customer-agent interactions, problems, solutions, dialogue and summary reports may be used.

Figure 5:
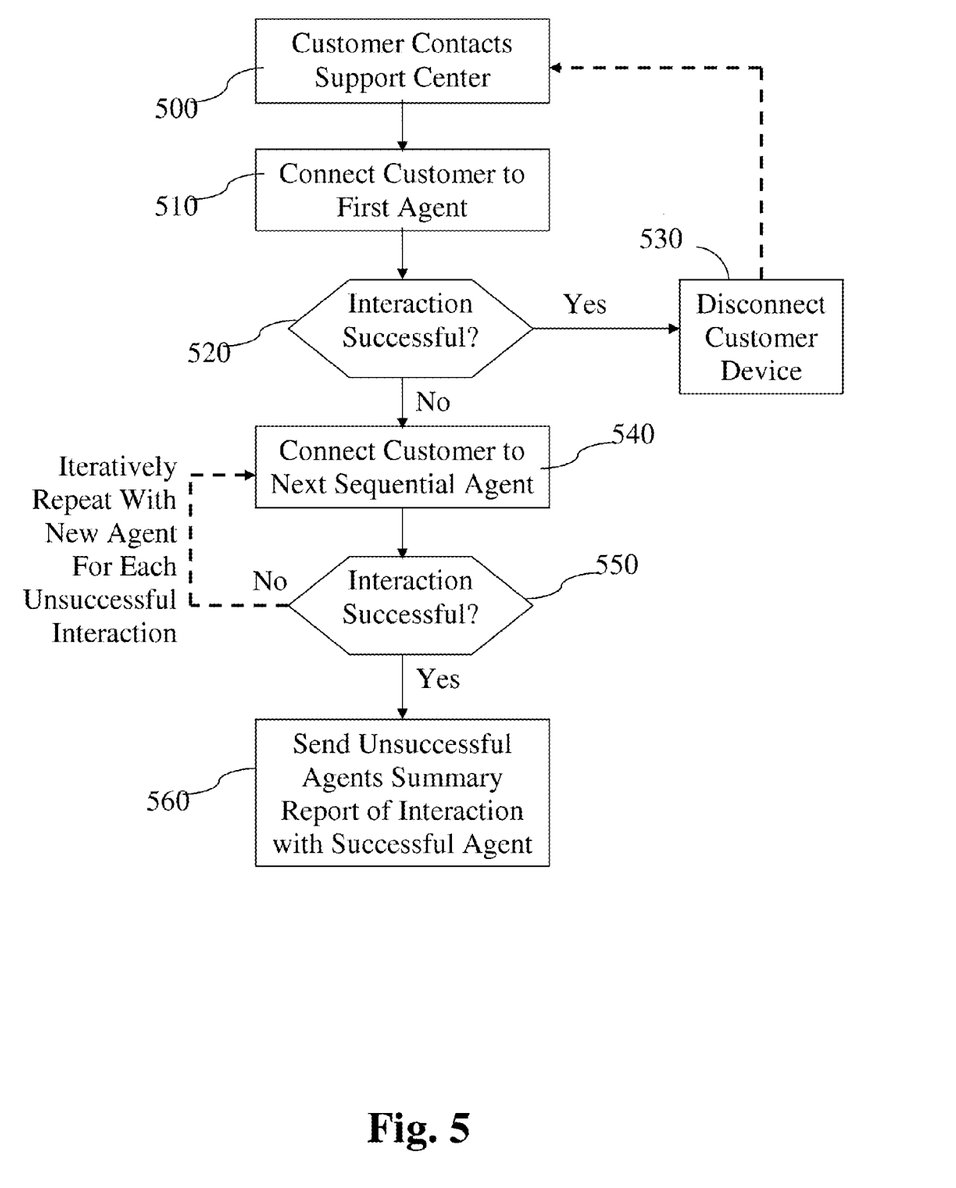
FIG. 5 is a flowchart of a method for handling customer-agent interactions in accordance with an embodiment of the invention.

Reference is made to FIG. 5, which is a flowchart of a method for handling customer-agent interactions in accordance with an embodiment of the invention. The method may be executed by a processor, such as, processor(s) 112, 142, and/or 136, of training module 110, support center 124, and/or agent device 120, respectively, of FIG. 1.

In operation 500, a customer device (e.g., user device 102 of FIG. 1) may contact a support center (e.g., support center 124 of FIG. 1), for example, by requesting a connection.

In operation 510, the customer device may be connected to a first agent device (e.g., agent device 120 of FIG. 1), for example, using a switching station (e.g., switch 410 of FIG. 4) at the support center. A connection may be for example an audio connection, a text connection, or another connection, enabling a customer to communicate with an agent.

In operation 520, the success of the interaction between the customer device and agent device connected in operation 510 may be determined. In one embodiment, the success of the interaction may be determined manually by receiving customer feedback. In another embodiment, the success of the interaction may be determined automatically by an analysis module (e.g., analysis module 115 of FIG. 1) using a voice recognition system to recognize pre-defined key-words or tone signifying success, such as, "can I help you with anything else?" from the agent or "that's all" from the customer or pre-defined key-words or tone signifying failure, such as, "sorry" or "I'm not sure" from the agent or "please transfer me" from the customer. (In a system where interaction is text based, voice recognition need not be used, rather text analysis may be used.) For example, an interaction (e.g. a recording or a transcript) may be sent to the voice recognition or text analysis system, which searches for the key-words and/or verifies the success or failure by determining if the customer tone is positive or negative, respectively. In another embodiment, the success of the interaction may be determined automatically by a training module (e.g., training module 110 of FIG. 1), the support center or the agent device detecting if the user is transferred to another agent device or department indicating that their problem may still be unsolved. If the interaction is successful, a process or processor may proceed to operation 530, while if the interaction is unsuccessful, a process or processor may proceed to operation 540.

In operation 530, the customer device may be disconnected, for example, from the agent device and support center. In some examples, the customer device may contact the call center again to re-connect with a different first agent.

In operation 540, the customer device may be connected to a next sequentially available agent device.

In operation 550, the success of the interaction between the customer device and agent device connected in operation 540 may be determined. If the interaction is successful, a process or processor may proceed to operation 560. However, if the interaction is unsuccessful, a process or processor may return to operation 540 where the customer device may be connected to a new next sequential agent. Connecting to a new agent may involve transferring the connection (and thus transferring the customer) to a new agent.

Operations 540 and 550 may repeat iteratively for each unsuccessful interaction to connect the customer device with each sequential agent, until a successful interaction is detected with a second agent and a process or processor may proceed to operation 560.

In operation 560, a summary of the successful interaction with a second agent may be sent to each agent unsuccessful in resolving the customer's problem (e.g., or a subset of those agents that satisfy a predetermined criteria, such as, agents in the same department, with the same target training level, with the same security clearance, etc.). The first and second agents may be consecutive or non-consecutive, depending on how many iterations of operations 540 and 550 are needed for success.

Other operations or orders of operations may be used. For example, in some embodiments, an interaction may be determined to be successful or resolved when the interaction ends and the customer device disconnects. Therefore, operation 520 (e.g., determining the success of the interaction) may be executed after or inherently as a result of operation 530 (e.g., when the customer device is disconnected).

It may be appreciated that "real-time" may refer to instantly, at a small time delay of, for example, between 0.01 and 10 seconds, during, concurrently, or substantially at the same time as. For example, sending a report summarizing a successful interaction in real-time may include sending the summary report while the successful agent is conversing with the customer e.g., via telephone (other media of communication are possible, such as on-line text chat).

It may be appreciated that although embodiments of the invention are described to operate in real-time, such embodiments may also operate off-line, for example, at a later time. In one embodiment, reports summarizing a successful agent's interaction may be sent to unsuccessful agents after the occurrence of the successful interaction, for example, at a predetermined time or time delay after the successful interaction.

It may be appreciated that although certain devices and functionality are assigned to "customers" and "agents" in a support center environment, such functionality may be implemented by any users in any environment. Users may include two or more live users, two or more automated user(s) or a combination of live user(s) and automated user(s).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for handling customer-agent interactions, the method comprising:
  automatically in one or more processors:
    detecting an unsuccessful interaction between a customer and a first agent unable to resolve a problem;
    detecting that the customer's device is iteratively transferred from a first agent device of a pair of agents to a second agent device of a pair of agents after each unsuccessful interaction with the first agent of the pair;
    detecting a successful interaction between the customer and a second agent that resolves the problem; and sending to each of the devices of agents that did not handle the interaction successfully after the successful interaction ends, a report summarizing the successful interaction by the second agent that resolves the problem including a screen shot of the successful interaction captured from the second agent's device.

2. The method of claim 1, wherein the customer's device is connected to the first and second agents devices in separate interaction sessions.

3. The method of claim 1, wherein the first and second agent interactions use one or more types of communication selected from the group consisting of: voice/Voice over Internet Protocol (VoIP), chat, texting or messaging, micro-blogging, video, Internet and email.

4. The method of claim 1, wherein the report includes text data generated by automatically editing a text transcription of an audio recording of the successful interaction by extracting sentences, words or phrases from the text transcription that include predetermined key-words.

5. The method of claim 1, comprising sending the report to devices of all agents that had interactions with the customer about the problem.

6. The method of claim 1, comprising sending the report to devices of a subset of agents that had interactions with the customer about the problem, wherein the agents in the subset satisfy one or more predetermined criteria selected from the group consisting of: agents in the same department as the second agent, agents with same target training level as the second agent, agents with the same security clearance as the second agent, and agents who have failed a predetermined number of times to provide solutions to other problems in the same training category as a category of the problem.

7. The method of claim 1, wherein an unsuccessful interaction with the first agent is automatically detected when the customer's device is re-connected to a different agent device.

8. The method of claim 1, wherein an unsuccessful interaction with the first agent is automatically detected by recognizing pre-defined key-words at a voice recognition system.

9. The method of claim 1, wherein an unsuccessful interaction with the first agent is detected by receiving negative feedback from the customer.

10. The method of claim 1 comprising only tracking interactions in interesting sessions that satisfy one or more predetermined interesting criteria selected from the group consisting of: sessions with more than a predetermined number of interactions, sessions with more than a predetermined number of transfers, sessions where the customer contacts a support center more than a predetermined number of times, sessions where the customer is transferred more than a predetermined number of times, and sessions where the customer contacts the first agent in a different session than the second agent and where the first and second agents are in the same department.

11. A system for handling customer-agent interactions, the system comprising:
one or more processors to detect an unsuccessful interaction between a customer and a first agent unable to resolve a problem, detect that the customer's device is iteratively transferred to a next sequential agent device in a sequence of devices of agents after completing an unsuccessful interaction with a current agent in the sequence, detect a successful interaction between the customer and a second agent in the sequence of agents that resolves the problem, and send each of the devices of unsuccessful agents in the sequence of agents after the successful interaction ends a report summarizing the successful interaction by the second agent including a screen shot of the successful interaction captured from the second agent's device.

12. The system of claim 11, wherein the customer operates a device that is connected to the first and second agent devices in separate interaction sessions.

13. The system of claim 11, wherein the first and second agent interactions use one or more types of communication selected from the group consisting of: voice/Voice over Internet Protocol (VoIP), chat, texting or messaging, micro-blogging, video, Internet and email.

14. The system of claim 11, wherein the processor generates the report by automatically editing a text transcription of an audio recording of the successful interaction by extracting sentences, words or phrases from the text transcription that include predetermined key-words.

15. The system of claim 14 comprising a voice recognition system to generate the text transcription of the audio recording of the successful interaction.

16. The system of claim 11, wherein the processor automatically detects the unsuccessful interaction with the first agent when the same customer's device is re-connected to a different agent device.

17. The system of claim 11 comprising a voice recognition system to recognize words in audio recordings of the agent interactions, wherein the processor automatically detects the unsuccessful interaction with the first agent when the voice recognition system recognizes key-words pre-defined to be associated with unsuccessful interactions.

18. The system of claim 11, wherein the processor automatically detects the unsuccessful interaction with the first agent by receiving negative feedback from the customer.

19. The system of claim 11, wherein the processor only tracks interactions in interesting sessions that satisfy one or more predetermined interesting criteria selected from the group consisting of: sessions with more than a predetermined number of interactions, sessions with more than a predetermined number of transfers, sessions where the customer contacts a support center more than a predetermined number of times, sessions where the customer is transferred more than a predetermined number of times, and sessions where the customer contacts the first agent in a different session than the second agent and where the first and second agents are in the same department.

20. The system of claim 11 comprising a screen at the first agent device, wherein the screen displays the report summarizing the successful interaction by the second agent.

* * * * *